United States Patent
Sujith et al.

(10) Patent No.: US 10,604,624 B2
(45) Date of Patent: Mar. 31, 2020

(54) METHOD FOR PRODUCING POLY(ALKYLENE CARBONATE)POLYOL

(71) Applicant: SK Innovation Co., Ltd., Seoul (KR)

(72) Inventors: Sudevan Sujith, Daejeon (KR); Je Ho Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 187 days.

(21) Appl. No.: 15/437,729

(22) Filed: Feb. 21, 2017

(65) Prior Publication Data

US 2017/0247509 A1  Aug. 31, 2017

(30) Foreign Application Priority Data

Feb. 26, 2016 (KR) .................. 10-2016-0023389

(51) Int. Cl.
*C08G 65/26* (2006.01)

(52) U.S. Cl.
CPC ....... *C08G 65/269* (2013.01); *C08G 65/2603* (2013.01); *C08G 65/2663* (2013.01); *C08G 65/2696* (2013.01)

(58) Field of Classification Search
CPC ............ C08G 65/269; C08G 65/26003; C08G 65/2663; C08G 65/2693; C08G 64/34; C09B 57/10
See application file for complete search history.

(56) References Cited

U.S. PATENT DOCUMENTS

| | | | |
|---|---|---|---|
| 2011/0230580 A1* | 9/2011 | Allen ................ | C08G 64/0208 521/172 |
| 2012/0232245 A1* | 9/2012 | Jeong ................ | C08G 65/2603 528/405 |
| 2016/0152651 A1* | 6/2016 | Jung .................. | B01J 31/12 528/405 |

FOREIGN PATENT DOCUMENTS

KR       100853358 B1    8/2008

OTHER PUBLICATIONS

Min et al., "Efficient Synthese of a Highly Active Catalyst for CO2/Epoxide Copolymerization," Bull. Korean Chem. Soc., 2009, pp. 745-748, vol. 30:3.
Na et al., "Elucidation of the Structure of a Highly Active Catalytic System for CO2/Epoxide Copolymerization: A salen-Cobaltate Complex of an Unusal Binding Mode", Inorganic Chemistry, 2009, pp. 10455-10465, vol. 48.

* cited by examiner

*Primary Examiner* — Shane Fang
(74) *Attorney, Agent, or Firm* — The Webb Law Firm

(57) ABSTRACT

Provided is a method for producing poly(alkylene carbonate)polyol, and specifically, a method for producing poly (alkylene carbonate)polyol having carbonate, ester, and ether bonds by mixing a Salen-based catalyst and a double metal cyanide catalyst.

9 Claims, No Drawings

METHOD FOR PRODUCING POLY(ALKYLENE CARBONATE)POLYOL

CROSS-REFERENCE TO RELATED APPLICATION

This application claims priority to Korean Patent Application No. 10-2016-0023389 filed Feb. 26, 2016, the disclosure of which is hereby incorporated in its entirety by reference.

TECHNICAL FIELD

The present invention relates to a method for producing poly(alkylene carbonate)polyol, and more specifically, to a method for producing a low molecular weight poly(alkylene carbonate)polyol.

BACKGROUND

Poly(alkylene carbonate)polyol is an easily biodegradable polymer, and is useful as, for example, an adhesive, a packaging material, or a coating material. Methods for producing poly(alkylene carbonate)polyol from an epoxide compound and carbon dioxide are highly eco-friendly in that phosgene which is harmful compound is not used, and carbon dioxide is able to be cheaply obtained.

Since 1960's, many researchers have developed various types of catalysts to produce poly(alkylene carbonate)polyol from the epoxide compound and the carbon dioxide. Recently, a highly active and highly selective catalyst synthesized from a Salen ([$H_2$Salen=N,N'-bis(3,5-dialkylsalicylidene)-1,2-ethylenediamine] type ligand including a quaternary ammonium salt has been developed (Korean Patent Registration No. 10-0853358). The previously reported catalyst is capable of producing a copolymer showing high activity and high selectivity and having a high molecular weight, and is possible to be polymerized even at high temperature, which is applicable to a commercial process. In addition, the catalyst includes the quaternary ammonium salt in the ligand, and therefore, after a carbon dioxide/epoxide copolymerization reaction, the catalyst is able to be easily separated from the copolymer, and is reusable.

Meanwhile, double metal cyanide (DMC) catalysts are used in producing a plurality of polymer products including polyether, polyester, and polyetherester polyol.

The double metal cyanide (DMC) catalysts are generally produced by reacting a metal salt aqueous solution and a metal cyanide salt aqueous solution in the presence of an organic complex ligand, for example, ether. However, in the case of the double metal cyanide (DMC) catalyst produced by the reaction above, since the metal salt aqueous solution has significantly low solubility to an organic solvent, the catalyst is produced using $H_2O$ and then, is washed with the organic solvent several times, which causes inconvenience. In addition, since it is difficult to control a content of water or alcohol included in the catalyst, there is a disadvantage in that activities are largely different for each batch of the catalyst, and thus, commercial use of the catalyst has been limited.

SUMMARY

The present inventors found that when a Salen catalyst, which is a metal complex compound synthesized from a Salen type ligand including a quaternary ammonium salt, and a double metal cyanide (DMC) catalyst including hydrogen ion were mixed instead of using the conventional catalysts, followed by copolymerization with carbon dioxide, epoxide compound, and a chain transfer agent, it was possible to produce a binary copolymer capable of controlling physical properties such as molecular weight, etc., at a high yield, due to higher activity than those of the conventional catalysts, and completed the present invention.

Thus, one object of the present invention is to provide a method for producing a poly(alkylene carbonate)polyol having carbonate and ether bonding units with increased polymerization activities Another object of the present invention is to provide a method for producing a poly(alkylene carbonate)polyol wherein physical properties such as a molecular weight may be easily controlled.

The above objects of the present invention will be achieved by the following characteristics:

A method for producing poly(alkylene carbonate)polyol includes: reacting epoxide compound, carbon dioxide, and a chain transfer agent in the presence of a Salen-based catalyst and a double metal cyanide (DMC) catalyst.

The chain transfer agent may be diol, triol, or a mixture thereof.

The chain transfer agent may be diethylene glycol, triethylene glycol, tetraethylene glycol, higher poly(ethylene glycol), dipropylene glycol, tripropylene glycol, bisphenol A, higher poly(propylene glycol), hydroquinone, 1,4-cyclohexanedimethanol, dicyclopentadiene-diOH, or a mixture thereof, and may be used in 10 to 3,000 moles based on 1 mole of the Salen-based catalyst.

The poly(alkylene carbonate) may have carbonate and ether bonding units.

The epoxide compound may be one or more selected from the group consisting of alkylene oxide; cycloalkylene oxide; and styrene oxide.

The Salen-based catalyst and the double metal cyanide catalyst may be mixed at a weight ratio of 90:10 to 10:90.

The epoxide compound may be used in 5,000 to 1,000,000 moles based on 1 mole of the Salen-based catalyst.

the Salen catalyst may be synthesized from the Salen type ligand including a quaternary ammonium salt, and the double metal cyanide (DMC) catalyst may include hydrogen ion.

According to the method of the present invention, activities of the catalysts can be increased.

According to the method of the present invention, physical properties such as a molecular weight of the poly(alkylene carbonate)polyol to be produced, may be easily controlled depending on weight contents of the two catalysts and a used amount of the chain transfer agent.

DETAILED DESCRIPTION OF EMBODIMENTS

The present invention relates to a method for producing a low molecular weight poly(alkylene carbonate)polyol, the method including: reacting epoxide, carbon dioxide, and a chain transfer agent in the presence of a Salen-based catalyst and a double metal cyanide catalyst.

According to the method for producing the low molecular weight poly(alkylene carbonate)polyol of the present invention, the Salen catalyst and the double metal cyanide (DMC) catalyst are simultaneously used to be capable of producing a copolymer having high yield due to high activity of the Salen catalyst, and to be capable of producing poly(alkylene carbonate)polyol having an ether bonding unit in the copolymer due to the double metal cyanide catalyst.

Further, a weight ratio of the Salen catalyst and the double metal cyanide catalyst may be controlled to control a content of the ether bonding unit of the poly(alkylene carbonate) polyol to be produced, thereby providing flexibility to a polymer chain. Further, a kind and a content of the chain transfer agent may be controlled to be capable of obtaining the poly(alkylene carbonate)polyol in which physical properties such as a molecular weight, etc., are easily controlled to be desired. The Salen catalyst according to an exemplary embodiment of the present invention is a catalyst having a Salen type ligand, and preferably, may be represented by Chemical Formula 1 below:

[Chemical Formula 1]

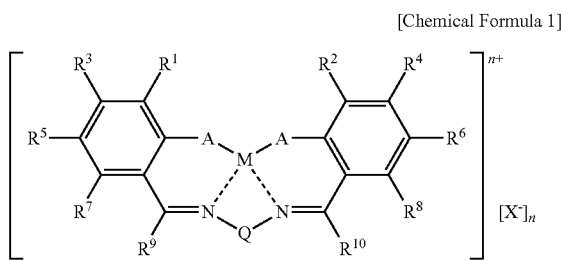

in Chemical Formula 1,

M is divalent cobalt, divalent chromium, trivalent cobalt or trivalent chromium;

A is an oxygen atom or a sulfur atom;

Q is diradical linking two nitrogen atoms;

$R^1$ to $R^{10}$ are each independently hydrogen; halogen; alkyl; alkenyl; alkylaryl; arylalkyl; alkoxy; aryloxy; formyl; alkylcarbonyl; arylcarbonyl; alkylsilyl; arylsilyl; or a metalloid radical of a Group 14 metal substituted with hydrocarbyl;

two of the $R^1$ to $R^{10}$ may be linked to each other to form a ring;

at least one of the hydrogens included in the $R^1$ to $R^{10}$ and Q is a proton group selected from the group consisting of the following Chemical Formula a, Chemical Formula b, Chemical Formula c, and Chemical Formula d:

[Chemical Formula a]

[Chemical Formula b]

[Chemical Formula c]

[Chemical Formula d]

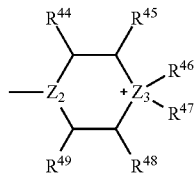

$X^-$ is each independently a halogen anion; $HCO_3^-$; $BF_4^-$; $ClO_4^-$; $NO_3^-$; $PF_6^-$; aryloxy anion; alkylcarboxy anion; arylcarboxy anion; alkoxy anion; alkyl carbonate anion; arylcarbonate anion; alkylsulfonate anion; alkylamido anion; arylamido anion; alkylcarbamate anion; or arylcarbamate anion;

$Z_1$ to $Z_3$ are each independently a nitrogen atom or a phosphorus atom;

$R^{21}$, $R^{22}$, $R^{23}$, $R^{31}$, $R^{32}$, $R^{33}$, $R^{34}$, and $R^{35}$ are each independently alkyl; alkenyl; alkylaryl; arylalkyl; or a metalloid radical of a Group 14 metal substituted with hydrocarbyl; wherein two of the $R^{21}$, $R^{22}$, and $R^{23}$ or two of the $R^{31}$, $R^{32}$, $R^{33}$, $R^{34}$, and $R^{35}$ may be linked to each other to form a ring;

$R^{41}$, $R^{42}$, $R^{43}$, $R^{44}$, $R^{45}$, $R^{46}$, $R^{47}$, $R^{48}$, and $R^{49}$ are each independently hydrogen; alkyl; alkenyl; alkylaryl; arylalkyl; or a metalloid radical of a Group 14 metal substituted with hydrocarbyl; wherein two of the $R^{41}$, $R^{42}$, and $R^{43}$ or two of the $R^{44}$, $R^{45}$, $R^{46}$, $R^{47}$, $R^{48}$, and $R^{49}$ may be linked to each other to form a ring;

X' is an oxygen atom, a sulfur atom or N—R (wherein R is alkyl);

the alkyl, alkenyl, alkylaryl, arylalkyl, alkoxy, aryloxy, alkylcarbonyl, arylcarbonyl, alkylsilyl or arylsilyl of the $R^1$ to $R^{10}$; the alkyl, alkenyl, alkylaryl, arylalkyl of the $R^{21}$, $R^{22}$, $R^{23}$, $R^{31}$, $R^{32}$, $R^{33}$, $R^{34}$, $R^{35}$, $R^{41}$, $R^{42}$, $R^{43}$, $R^{44}$, $R^{45}$, $R^{46}$, $R^{47}$, $R^{48}$, and $R^{49}$; and the aryloxy anion, alkylcarboxy anion, arylcarboxy anion, alkoxy anion, alkylcarbonate anion, arylcarbonate anion, alkylsulfonate anion, alkylamido anion, arylamido anion, alkylcarbamate anion or arylcarbamate anion of the $X^-$ may be each independently further substituted with one or more selected from the group consisting of halogen, nitro, alkyl, alkenyl, alkylaryl, arylalkyl, —$NR^aR^b$, —$OR^c$, —$SiR^dR^eR^f$, —$SR^g$, and —$PR^hR^i$;

$R^a$, $R^b$, $R^c$, $R^d$, $R^e$, $R^f$, $R^g$, $R^h$, and $R^i$ are each independently hydrogen, alkyl or aryl;

When the M is the divalent cobalt or the divalent chromium, n is the same as the total number of proton groups included in the $R^1$ to $R^{10}$, and Q;

When the M is the trivalent cobalt or the trivalent chromium, n is an integer obtained by adding 1 to the total number of proton groups included in $R^1$ to $R^{10}$, and Q;

$X^-$ may be coordinated with M; and a nitrogen atom of imine may be coordinated with or de-coordinated from the M.

The double metal cyanide catalyst according to an exemplary embodiment of the present invention may preferably be represented by the following Chemical Formula 2:

$$H^+[M^1(X^1)]^+_y[M^2(CN)_6]^{z-}$$ [Chemical Formula 2]

in Chemical Formula 2, $M^1$ is a transition metal, $X^1$ is an anionic salt, H is hydrogen, $M^2$ is any one metal cation selected from Fe(II), Fe(III), Co(II), Co(III), Cr(II), Cr(III), Ni(II), Rh(III), Ru(II), V(IV), and V(V), y is the same as a charge of $M^1$, z=y+1 is satisfied, and y and z are non-zero integers.

The chain transfer agent according to an exemplary embodiment of the present invention may be water, polyhydric alcohol, polyacid, primary amine, polyamine, amino alcohol, polythiol or a mixture thereof. In view of application to polyurethane, the chain transfer agent may be preferably diol, triol or a mixture thereof. In order that the poly(alkylene)carbonate polyol of the present invention is produced to be polyurethane having desired physical properties (modulus of elasticity and crystallinity, etc.) through a crosslinking reaction with methylene diphenyl diisocyanate (MDI), toluene diisocyanate (TDI), etc., the chain transfer agent may be preferably diethylene glycol, triethylene glycol, tetraethylene glycol, higher poly(ethylene glycol), dipropylene glycol, tripropylene glycol, bisphenol A, higher poly(propylene glycol), hydroquinone, 1,4-cyclohexanedimethanol, dicyclopentadiene-diOH, or a mixture thereof.

The "higher" described in the chain transfer agent of the present invention means a low moisture content within a range that is capable of being recognized by a person skilled in the art. Higher poly(ethylene glycol) and higher poly(propylene glycol), etc., are used to prevent moisture from acting as the chain transfer agent.

In addition, the poly(alkylene carbonate)polyol according to an exemplary embodiment of the present invention may have a low molecular weight. The low molecular weight described in the present invention means that a weight average molecular weight (Mw) is 5,000 or less, and in view of increasing compatibility, particularly, in view of easy application to polyurethane, the weight average molecular weight may preferably be 3000 or less, and favorably, 500 to 3000, and more preferably, 500 to 2800.

The chain transfer agent according to an exemplary embodiment of the present invention may be used in 10 to 3,000 moles, and preferably 50 to 2,000 moles, based on 1 mole of the Salen catalyst.

According to the method for producing the poly(alkylene carbonate)polyol of the present invention, unlike the related art, the chain transfer agent, particularly, diol and triol, are added to produce the poly(alkylene carbonate)polyol, and thus, it is possible to produce the low molecular weight of the poly(alkylene carbonate)polyol having a constant molecular weight distribution index and a low glass transition temperature at a high yield.

The poly(alkylene carbonate)polyol according to an exemplary embodiment of the present invention may contain the carbonate linkage and the ether linkage. Preferably, the carbonate linkage may have a content of 50 to 70%, and the ether linkage unit may have a content of 30 to 50%.

Preferably, in Chemical Formula 1 according to an exemplary embodiment of the present invention, the M is a trivalent cobalt; A is oxygen; Q is arylene, alkylene, alkenylene, alkynylene, cycloalkylene, or fused cycloalkylene; and the arylene, alkylene, alkenylene, cycloalkylene or fused cycloalkylene of the Q may be further substituted with one or more substituents selected from the group consisting of halogen, alkyl, aryl or nitro group; $R^1$ to $R^{10}$ are each independently hydrogen, alkyl, —[$YR^{51}_{3-a}${$(CR^{52}R^{53})_b$N$^+$R$^{21}$R$^{22}$R$^{23}$}$_a$] or

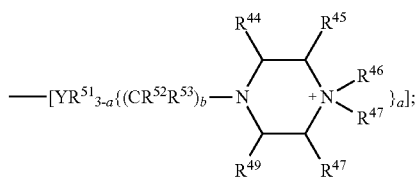

Y is C or Si; $R^{51}$, $R^{52}$, and $R^{53}$ are each independently hydrogen; halogen; alkyl; alkenyl; alkylaryl; arylalkyl; alkoxy; aryloxy; formyl; alkylcarbonyl; arylcarbonyl; or a metalloid radical of a Group 14 metal substituted with hydrocarbyl;

$R^{21}$, $R^{22}$, and $R^{23}$ are each independently alkyl; alkenyl; alkylaryl; arylalkyl; or a metalloid radical of a Group 14 metal substituted with hydrocarbyl; wherein two of the $R^{21}$, $R^{22}$, and $R^{23}$ may be linked to each other to form a ring;

$R^{44}$, $R^{45}$, $R^{46}$, $R^{47}$, $R^{48}$, and $R^{49}$ are each independently hydrogen; alkyl; alkenyl; alkylaryl; arylalkyl; or a metalloid radical of a Group 14 metal substituted with hydrocarbyl; wherein two of the $R^{41}$, $R^{42}$, and $R^{43}$ or two of the $R^{44}$, $R^{45}$, $R^{46}$, $R^{47}$, $R^{48}$, and $R^{49}$ may be linked to each other to form a ring;

the alkyl, alkenyl, alkylaryl or arylalkyl of the $R^{51}$, $R^{52}$, $R^{53}$, $R^{21}$, $R^{22}$, $R^{23}$, $R^{44}$, $R^{45}$, $R^{46}$, $R^{47}$, $R^{48}$, and $R^{49}$ may be each independently further substituted with one or more selected from the group consisting of halogen, nitro, alkyl, alkenyl, alkylaryl, arylalkyl, —NR$^a$R$^b$, —OR$^c$, —SiR$^d$R$^e$R$^f$, —SR$^g$, and —PR$^h$R$^i$;

R$^a$, R$^b$, R$^c$, R$^d$, R$^e$, R$^f$, R$^g$, R$^h$, and R$^i$ are each independently hydrogen, alkyl or aryl;

a is an integer of 1 to 3, b is an integer of 0 to 20; n is a value obtained by adding 1 to the total number of quaternary ammonium salts included in the $R^1$ to $R^{10}$; provided that at least one of $R^1$ to $R^{10}$ is —[$YR^{51}_{3-a}${$(CR^{52}R^{53})_b$N$^+$R$^{21}$R$^{22}$R$^{23}$}$_a$] or

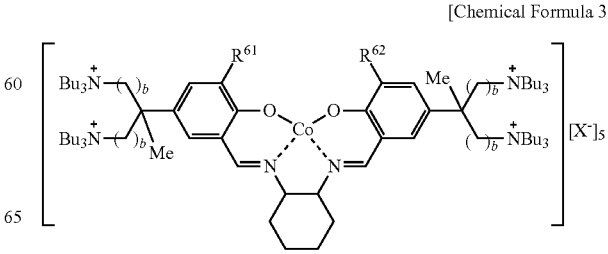

and $X^1$ of Chemical Formula 2 above may be any one selected from chloride, bromide, iodide, hydroxide, sulfate, carbonate, cyanide, oxalate, thiocyanate, isocyanate, carboxylate and nitrate.

In order to have high catalytic activity, the Q in Chemical Formula 1 above may be trans-1,2-cyclohexylene, phenylene or ethylene, and the double metal cyanide catalyst in Chemical Formula 2 may be coordinated with an organic solvent or water, wherein the organic solvent may be C1-C7 alkyl alcohol.

More preferably, the Salen catalyst represented by Chemical Formula 1 may be a complex compound represented by Chemical Formula 3 or 4 below; and the double metal cyanide (DMC) catalyst may be H$^+$[ZnCl]$^+_2$[Co(CN)$_6$]$^{3-}$[CH$_3$OH]:

[Chemical Formula 3]

[Chemical Formula 4]

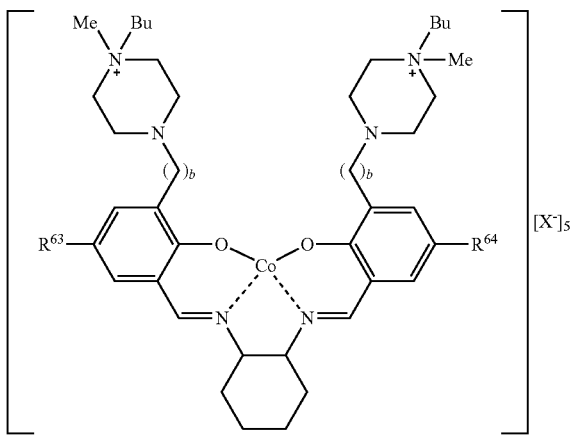

in Chemical Formulas 3 and 4 above, $R^{61}$ to $R^{64}$ are each independently hydrogen or alkyl; b is an integer from 1 to 20; $X^-$ is each independently halogen anion, nitrate anion, acetate anion, nitrophenolate anion or 2,4-dinitrophenolate anion; nitrogen of imine may be coordinated with or de-coordinated from cobalt, and the respective anions may be coordinated with cobalt.

The epoxide compound according to an exemplary embodiment of the present invention may be one or more selected from the group consisting of alkylene oxide; cycloalkylene oxide; and styrene oxide, preferably, alkylene oxide unsubstituted or substituted with halogen, alkyloxy, aryloxy or arylalkyloxy; cycloalkylene oxide unsubstituted or substituted with halogen, alkyloxy, aryloxy or arylalkyloxy; and styrene oxide unsubstituted or substituted with halogen, alkyloxy, aryloxy, arylalkyloxy, or alkyl, and the epoxide compound of the present invention may be used in 5,000 to 1,000,000 moles, and preferably, 15,000 to 200,000, based on 1 mole of the Salen catalyst.

Preferably, when the Salen catalyst of Chemical Formula 1 is represented by Chemical Formula 3 or 4, the double metal cyanide catalyst of Chemical Formula 2 is $H^+[ZnCl]^+_2$ $[Co(CN)_6]^{3-}[CH_3OH]$, and the chain transfer agent is one selected from bisphenol A, 1,4-cyclohexanedimethanol, hydroquinone, and dicyclopentadiene-diOH (DCPD-diOH), or a combination of two or more mixtures thereof, it is possible to produce the poly(alkylene carbonate)polyol having a wider application fields of physical properties, particularly, physical properties that are easily applied to polyurethane.

The Salen catalyst of Chemical Formula 1 and the double metal cyanide catalyst of Chemical Formula 2 according to an exemplary embodiment of the present invention may be mixed at a weight ratio of 90:10 to 10:90, and more preferably, 70:30 to 30:70.

In the method for producing the poly(alkylene carbonate)polyol by carbon dioxide/epoxide copolymerization of the present invention, a pressure of the carbon dioxide may be from normal pressure up to 100 atm, and preferably, 5 atm to 40 atm. In the binary copolymerization step, a polymerization temperature may be 20° C. to 120° C., and preferably, 50° C. to 90° C.

The method for producing the poly(alkylene carbonate)polyol by the carbon dioxide/epoxide copolymerization of the present invention may include a batch polymerization method, a semi-batch polymerization method or a continuous polymerization method. When the batch or semi-batch polymerization method is used, a reaction time may be 0.5 to 24 hours, and preferably, 0.5 to 10 hours, and when the continuous polymerization method is used, an average residence time of the catalyst is preferably 0.5 to 10 hours.

The 'alkyl', 'alkoxy' and other 'alkyl' as described herein may be saturated hydrocarbon chain radicals having 1 to 30, preferably, 1 to 20 carbon atoms, which may be substituted or unsubstituted.

The 'alkenyl' described herein is an unsaturated hydrocarbon group composed of 2 to 30, and preferably 2 to 20 carbon atoms having at least one carbon-carbon double bond, and the 'alkynyl' is an unsaturated hydrocarbon group composed of 2 to 30, and preferably 2 to 20 carbon atoms having at least one carbon-carbon triple bond, and the 'alkynyl' and the 'alkynyl' may be linear or branched, and may be substituted or unsubstituted. The 'aryl' described herein is an organic radical derived from aromatic hydrocarbon by removal of one hydrogen, may have 6 to 30 carbon atoms, and includes a single ring system or a fused ring system properly including 4 to 7 ring atoms, preferably, 5 or 6 ring atoms in each ring, and even includes a form in which a plurality of aryls are linked by a single bond. Specific examples of the aryl include phenyl, naphthyl, biphenyl, anthryl, indenyl, fluorenyl, etc., but the present invention is not limited thereto.

The "heteroaryl" described herein means an aryl group including 1 to 4 heteroatoms selected from B, N, O, S, P(=O), Si and P as an aromatic ring framework atom, and including carbon as a remaining aromatic ring framework atom, and is 5- to 6-membered monocyclic heteroaryl and polycyclic heteroaryl condensed with one or more benzene rings, and may be partially saturated.

The 'arylalkyl' described herein refers to an aryl group directly bonded to an alkyl group, and may be, for example, —$CH_2C_6H_5$ and —$C_2H_4C_6H_5$.

Unless otherwise defined, the 'substituted' described herein refers to a group or moiety having one or more substituents attached to a structural framework of the group or moiety, and may be further substituted with one or more selected from the group consisting of halogen, nitro, (C1-C20)alkyl, (C2-C20)alkenyl, (C1-C20)alkyl(C6-C20)aryl, (C6-C20)aryl(C1-C20)alkyl, $NR^aR^b$, —$OR^c$, —$SiR^dR^eR^f$, —$SR^g$, and —$PR^hR^i$, wherein the $R^a$, $R^b$, $R^c$, $R^d$, $R^e$, $R^f$, $R^g$, $R^h$, and $R^i$ are each independently hydrogen, alkyl or aryl.

The alkyl, alkenyl, alkyl and alkoxy described herein may be C1-C30, and preferably C1-C20, the aryl may be C6-C30, and preferably C6-C20, the heteroaryl may be C3-C30, and preferably C3-C20, and the cycloalkylene oxide may be C4-C30, and preferably C4-C20, and the styrene oxide may be C8-C30, and preferably C8-C20.

According to the method of the present invention, it is possible to control a ratio of the carbonate linkage and the ether linkage of the produced copolymer depending on the weight ratio of the kinds of the catalysts used in the copolymerization of epoxide compound and carbon dioxide, and the ratio of the chain transfer agent, and thus, a molecular weight, a glass transition temperature, and the degree of biodegradability of the produced poly(alkylene carbonate) polyol may be easily controlled, thereby producing the low molecular weight poly(alkylene carbonate)polyol having a more constant molecular weight distribution index and a low glass transition temperature at a high yield.

The carbon dioxide/epoxide copolymer produced by mixing the Salen catalyst represented by Chemical Formula 1, which is a metal trivalent complex compound synthesized from the Salen type ligand including the quaternary ammonium salt, and the double metal cyanide catalyst, followed by copolymerization with carbon dioxide, epoxide compound, and the chain transfer agent has the carbonate and ether linkages, and has a weight average molecular weight (Mw) of 500 to 15,000, and a molecular weight distribution index (i.e., Mw/Mn) of 2.1 to 5.0, and a glass transition temperature of −40 to −10° C. The poly(alkylene carbonate) polyol which is the carbon dioxide/epoxide copolymer produced by using the double metal cyanide catalyst represented by Chemical Formula 2 including hydrogen ion as the catalyst, followed by copolymerization with carbon dioxide, epoxide compound, and the chain transfer agent, has the carbonate, ester, and ether linkages. Herein, the Mn means a number average molecular weight measured by calibrating polystyrene having a single molecular distribution index with a standard material through GPC, and the molecular weight distribution index [Mw(weight average molecular weight)/Mn] means a ratio between a weight average molecular weight and a number average molecular weight that are specified by the same method through the GPC.

Hereinafter, a technical idea of the present invention will be described in more detail with reference to the accompanying drawings and Examples. However, the present invention is not limited to the following Examples and the accompanying drawings, and it will be apparent to those skilled in the art to which the present invention pertains that various modification and changes can be made without departing from the idea and scope of the present invention.

In addition, the following Examples and drawings are provided by way of example so that the idea of the present invention can be sufficiently transferred to those skilled in the art to which the present invention pertains. Therefore, the present invention is not limited to the drawings and Examples set forth herein but may be modified in many different forms.

Meanwhile, unless technical and scientific terms used herein are defined otherwise, they have meanings generally understood by those skilled in the art to which the present invention pertains. Known functions and components will be omitted so as not to obscure the gist of the present invention in descriptions below and the accompanying drawings.

PRODUCTION EXAMPLE 1

Synthesis of Catalyst (Compound 1)

A simple and economical method for synthesizing a catalyst of the present invention was shown below. The compound was synthesized by a known method (*Bull. Korean Chem. Soc.* 2009, 30, 745-748).

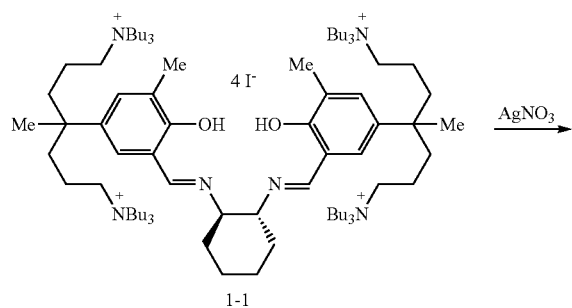

1-1

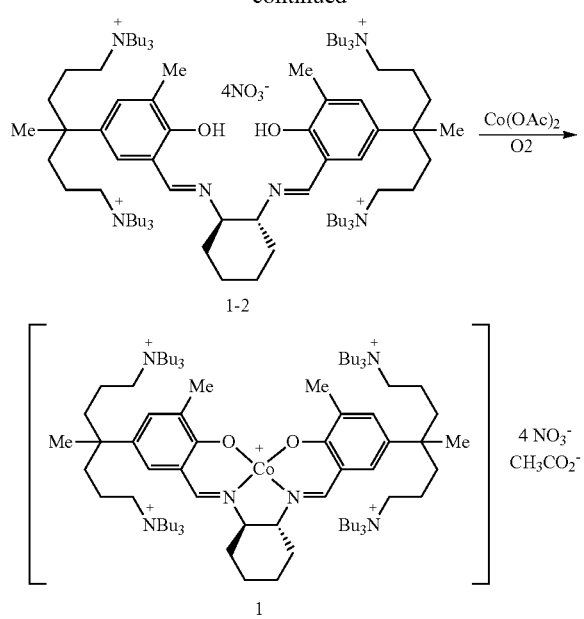

Synthesis of Compound 1-2

A compound 1-1 (100 mg, 0.054 mmol) and AgNO$_3$ (37.3 mg, 0.219 mmol) were dissolved in ethanol (3 mL), and stirred overnight. The mixture was filtered using celite to remove AgI produced from the above reaction. The solvent was removed by vacuum decompression to obtain a Compound 1-2 in a yellow solid powder form (0.80 g, 94%).

$^1$H NMR (CDCl$_3$): δ 13.51 (s, 2H, OH), 8.48 (s, 2H, CH=N), 7.15 (s, 4H, m-H), 3.44 (br, 2H, cyclohexyl-CH), 3.19 (br, 32H, NCH$_2$), 2.24 (s, 6H, CH$_3$), 1.57-1.52 (br, 4H, cyclohexyl-CH$_2$), 1.43-1.26 (br, 74H), 0.90-070 (br, 36H, CH$_3$) ppm.

Synthesis of Compound 1

The Compound 1-2 (95 mg, 0.061 mmol) and Co(OAc)$_2$ (10.7 mg, 0.061 mmol) were added in a flask, and methylene chloride (3 mL) was added to induce dissolution. The mixture was stirred for 3 hours at room temperature under oxygen gas, and then, the solvent was removed by reduced pressure, thereby obtaining a Compound 1 in a brown solid powder form (85 mg, 83%).

$^1$H NMR (DMSO-d$_6$, 38° C.): Major signal set, δ 7.83 (s, 2H, CH=N) 7.27 (br s, 2H, m-H), 7.22, 7.19 (brs, 2H, m-H), 3.88 (br, 1H, cyclohexyl-CH), 3.55 (br, 1H, cyclohexyl-CH), 3.30-2.90 (br, 32H, NCH$_2$), 2.58 (s, 3H, CH$_3$), 2.55 (s, 3H, CH$_3$), 2.10-1.80 (br, 4H, cyclohexyl-CH$_2$), 1.70-1.15 (br m, 74H), 1.0-0.80 (br, 36H, CH$_3$) ppm; Minor signal set, δ 7.65 (s, 2H, CH=N) 7.45 (s, 2H, m-H), 7.35 (s, 2H, m-H), 3.60 (br, 2H, cyclohexyl-CH), 3.30-2.90 (br, 32H, NCH$_2$), 2.66 (s, 6H, CH$_3$), 2.10-1.80 (br, 4H, cyclohexyl-CH$_2$), 1.70-1.15 (br m, 74H), 1.0-0.80 (br, 36H, CH$_3$) ppm.

$^1$H NMR (CD$_2$Cl$_2$): δ 7.65 (br, 2H, CH=N) 7.34 (br, 2H, m-H), 7.16 (br, 2H, m-H), 3.40-2.00 (br, 32H, NCH$_2$), 2.93 (br s, 6H, CH$_3$), 2.10-1.80 (br m, 4H, cyclohexyl-CH$_2$), 1.70-1.15 (br m, 74H), 1.1-0.80 (br, 36H, CH$_3$) ppm.

The two sets of signals were observed at a ratio of 6:4 in $^1$H NMR spectrum obtained by dissolving the compound in DMSO-d$_6$. The major signal set shows that two phenoxy ligands of the Salen-units are different, and the minor signal set shows that the two phenoxy ligands are the same. This is interpreted as that the Compound 1 is in an equilibrium state described below in the DMSO solvent. It was found that when a substituent having a small steric hindrance such as methyl is placed at an ortho position of the two phenoxy ligands of the Salen-units, the Compound 1 had structure in which nitrogen of imine was not coordinated in a polar solvent such as DMSO (*Inorg. Chem.* 2009, 48, 10455-10465). In a methylene chloride which is a non-polar solvent, a generally broad set of signals was observed. When considering that $NO_3^-$ anion has weak coordination power, it is expected that the Compound 1 may have a coordinated and de-coordinated structure in which the nitrogen of the imine is coordinated, and the nitrate anion and the acetate anion are exchanged on two axial coordination planes, as suggested in the following structure.

water. It was confirmed that the metal cyanide complex salt that passed through the ion-exchange resin from which the water was removed was $H_3Co(CN)_6 \cdot 0.5H_2O$ by standard titration of NaOH solution.

Production of DMC Catalyst $[ZnCl]^+_2$ $[HCo(CN)_6]^{2-}$·$[CH_3OH]$ (Compound 2)

2 equivalents of zinc chloride (2.94 g, 0.021 mol) containing methanol (15 mL) dissolved therein was dropwise added to $H_3Co(CN)_6 \cdot 0.5H_2O$ (2.45 g, 0.010 mol) dissolved in methanol (90 m). The reaction mixture was stirred under nitrogen atmosphere for 30 minutes, and methanol was evaporated to obtain a white solid, followed by dehydration at 60° C. for 2 hours. $H^+[ZnCl]^+_2[Co(CN)_6]^{3-}[CH_3OH]$

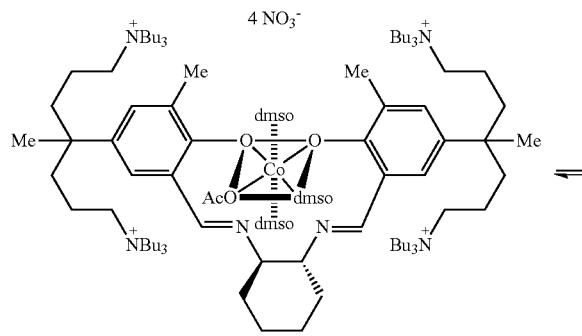

<Expected Structure in DMSO of Compound 1>

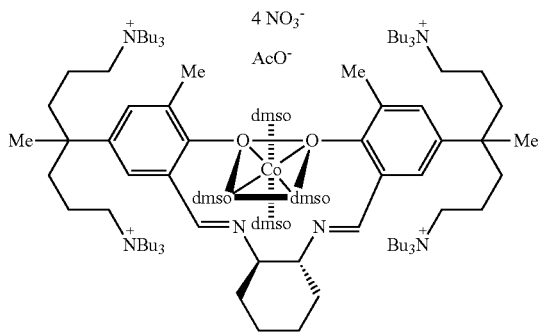

(4.45 g), which is the DMC catalyst, was obtained. Herein, 1.9 equivalent of hydrochloric acid per cobalt was produced.

EXAMPLES 1 to 6

Production of Poly(Alkylene Carbonate)Polyol by Propylene Oxide/Carbon Dioxide Copolymerization Using Compound 1 and Compound 2 as Catalysts The Compound 1 catalyst and the Compound 2 catalyst produced as above were added to a 3 reactor under a nitrogen atmosphere, respectively, as shown in Table 1 below, and propylene oxide (1000 ml) and bisphenol A were then added thereto, and the reactor was assembled. The catalysts and the bisphenol A were added in amounts shown in Table 1, respectively. The reactor was set under conditions of 60° C. and 35 bar while stirring, and after 1 hour, it was observed that a carbon dioxide gas pressure was decreased. A polymerization reaction was performed for 4 hours from the start at which the carbon dioxide pressure was decreased and the reaction started. After the reaction was completed, 5 eq of malonic acid was added as a quenching agent based on 1 eq of the Compound 1 catalyst, to terminate the reaction, and a mucous solution was obtained. Propylene oxide (1000 ml) was further added to the obtained mucous solution, thereby decreasing a viscosity of the solution. Then, silica gel (50 g, manufactured by Merck, 0.040 to 0.063 mm particle diameter (230 to 400 mesh)) was added and stirred to remove the Compound 1 catalyst. The propylene oxide was removed by vacuum decompression to obtain a transparent solid as a propylene oxide/carbon dioxide binary copolymer.

Table 1 below shows contents of the compounds used in the production of the propylene oxide/carbon dioxide binary copolymers, and physical properties of the produced propylene oxide/carbon dioxide binary copolymers.

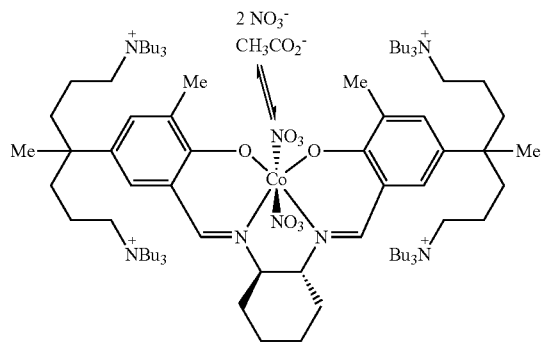

<Expected Structure in $CH_2Cl_2$ of Compound 1>

PRODUCTION EXAMPLE 2

Synthesis of DMC Catalyst $[ZnCl]^+_2$ $[HCo(CN)_6]^{2-}$·$[CH_3OH]$ (Compound 2)

Production of $H_3Co(CN)_6$

Potassium hexacyanocobaltate(III) (5 g) (15 mmol) was dissolved in distilled water (15 ml), and the mixture was immersed in an ion-exchange resin (Dowex 5x4-200) (140 g), and was filtered after 3 hours. The filtrate of the ion-exchange resin was subjected to re-immersion in the ion-exchange resin about four times, and then, it was confirmed that $K^+$ ions were completely exchanged with hydrogen ions. The filtered ion-exchange resin may be re-used by washing the resin with 2N aqueous sulfuric acid solution. $H_3Co(CN)_6$ was separated from the filtrate by a rotary evaporator, and the product was kept in a vacuum desiccator in the presence of $P_2O_5$ for 12 hours, to remove residual

COMPARATIVE EXAMPLES 1 to 2

Propylene oxide/carbon dioxide binary copolymers of Comparative Example 1 and Comparative Example 2 were produced, respectively, in the same manner as in Example 1, except that the Compound 1 catalyst having the composition as shown in Table 1 in Example 1 was used alone or the Compound 2 having the composition as shown in Table 1 in Example 1 was used alone, and contents of the used compounds and physical properties of the produced propylene oxide/carbon dioxide binary copolymers were shown in Table 1.

TABLE 1

| | Catalyst Co-Salen/ DMC (mg) | CTA (eq) based on Co-Salen catalyst | Yield (g) | $f_{CO2}$ (%) | Selectivity (%) | Mw | Mw/Mn | Tg (° C.) | TGA (° C.) 5% | 50% | 95% |
|---|---|---|---|---|---|---|---|---|---|---|---|
| Example 1 | 500/400 | 1000 | 665 | 79 | 94 | 2080 | 3.2 | −22 | 255 | 247 | 218 |
| Example 2 | 500/500 | 1000 | 680 | 71 | 96 | 2160 | 3.1 | −28 | 261 | 253 | 210 |
| Example 3 | 500/700 | 1000 | 730 | 60 | 91 | 2350 | 3.4 | −34 | 266 | 250 | 212 |
| Example 4 | 500/1000 | 1000 | 820 | 56 | 85 | 2700 | 4.7 | −37 | 276 | 254 | 213 |
| Example 5 | 700/500 | 1200 | 710 | 76 | 94 | 1780 | 2.4 | −18 | 262 | 247 | 215 |
| Example 6 | 700/400 | 1200 | 690 | 80 | 96 | 1690 | 2.2 | −14 | 257 | 243 | 210 |
| Comparative Example 1 | 500/0 | 1000 | 520 | >99 | 98 | 1960 | 1.1 | 4.7 | 245 | 230 | 211 |
| Comparative Example 2 | 0/500 | 1000 | 490 | 48 | 81 | 2020 | 4.1 | −55 | 304 | 270 | 217 |

$f_{CO2}$ is a carbonate fraction in the produced polyol.
Poly. conditions: PO (1.0 L); Temp is 60° C.; Pressure is 35 bar; and Time is 4 hrs.
CTA (chain transfer agent) is bisphenol-A.

It may be appreciated from Table 1 that when the Salen catalyst represented by Chemical Formula 1 and the double metal cyanide catalyst represented by Chemical Formula 2 are mixed to be used, it is possible to produce a low molecular weight of epoxide/carbon dioxide binary copolymer having a specific glass transition temperature value at a high yield.

That is, when only the Compound 1 belonging to the Salen catalyst represented by Chemical Formula 1 is used as a catalyst, an epoxide/carbon dioxide binary copolymer in which a molecular weight distribution index is low and a glass transition temperature is high is obtained, which deteriorates compatibility. However, when the Salen catalyst represented by Chemical Formula 1 and the double metal cyanide catalyst represented by Chemical Formula 2 are mixed to be used, disadvantages of the epoxide/carbon dioxide binary copolymer produced by using only the Salen catalyst represented by Chemical Formula 1 may be supplemented, and the content of carbonate may be increased, thereby producing the epoxide/carbon dioxide binary copolymer having an increased mechanical properties such as strength, etc.

In other words, it is possible to obtain a low molecular weight of epoxide/carbon dioxide binary copolymer having a proper glass transition temperature and a constant molecular weight distribution index at a high yield by simultaneously using the Compound 1 and the Compound 2 as the catalysts. Further, it is possible to easily obtain the epoxide/carbon dioxide binary copolymer having high compatibility, particularly, having physical properties that are easily applied to polyurethane polymerization by controlling the weight ratio of the two catalysts, and adding the chain transfer agent, thereby controlling the physical properties such as viscosity, etc.

According to the method for producing poly(alkylene carbonate)polyol of the present invention, it is possible to produce a low molecular weight poly(alkylene carbonate) polyol containing carbonate and ester bonding units by mixing a Salen catalyst synthesized from a Salen type ligand including a quaternary ammonium salt and a double metal cyanide catalyst including hydrogen ion.

According to the method for producing the poly(alkylene carbonate)polyol of the present invention, the Salen catalyst and the double metal cyanide catalyst may be mixed to control the weight ratio of the two catalysts, thereby controlling the contents of carbonate, ester, and ether linkages.

The contents of these linkages may be controlled to control physical properties of poly(alkylene carbonate)polyol to be produced, thereby producing poly(alkylene carbonate) polyol having desired physical properties, specifically, controlled glass transition temperature, and biodegradability degree, etc.

In addition, according to the method for producing the poly(alkylene carbonate)polyol of the present invention, it is possible to produce the low molecular weight poly(alkylene carbonate)polyol having desired physical properties by simultaneously using the two catalysts and by simultaneously using the chain transfer agent.

That is, according to the method for producing poly (alkylene carbonate)polyol of the present invention, it is easier to control the contents of the carbonate and ether linkages in the poly(alkylene carbonate)polyol produced by further using the chain transfer agents, particularly, diol and triol, unlike conventional methods. Therefore, it is possible to produce the low molecular weight poly(alkylene carbonate)polyol having a high heat stability, a constant molecular weight distribution index, and a low glass transition temperature at a high yield.

What is claimed is:

1. A method for producing poly(alkylene carbonate) polyol comprising:

reacting alkylene oxide, carbon dioxide, and a chain transfer agent in the presence of a Salen-based catalyst represented by the following chemical formula 3 and a double metal cyanide catalyst represented by the following chemical formula 2, wherein the poly(alkylene carbonate)polyol has a weight average molecular weight of 500 to 15,000, and a molecular weight distribution index of 2.1 to 5.0, and a glass transition temperature of −40 to −10° C.,

[Chemical Formula 3]

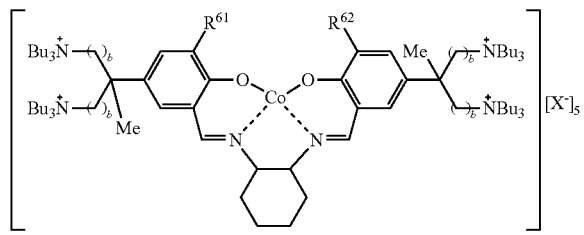

in Chemical Formula 3 above, $R^{61}$ or $R^{62}$ are each independently hydrogen or alkyl; b is an integer from 1 to 20; $X^-$ is each independently halogen anion, nitrate anion, acetate anion, nitrophenolate anion or 2,4-dinitrophenolate anion; nitrogen of imine may be coordinated with or de-coordinated from cobalt, and the respective anions may be coordinated with cobalt, $$H^+[M^1(X^1)]^+_y[M^2(CN)_6]^{Z-}$$ [Chemical Formula 2]

in Chemical Formula 2, $M^1$ is a transition metal, $X^1$ is an anionic salt, H is hydrogen, $M^2$ is any one metal cation selected from Fe(II), Fe(III), Co(II), Co(III), Cr(II), Cr(III), Ni(II), Rh(III), Ru(II), V(IV), and V(V), y is the same as a charge of $M^1$, z=y+1 is satisfied, and y and z are non-zero integers.

2. The method of claim 1, wherein the chain transfer agent is diol, triol, or a mixture thereof.

3. The method of claim 2, wherein the chain transfer agent is diethylene glycol, triethylene glycol, tetraethylene glycol, higher poly(ethylene glycol), dipropylene glycol, tripropylene glycol, bisphenol A, higher poly(propylene glycol), hydroquinone, 1,4-cyclohexanedimethanol, dicyclopentadiene-diOH, or a mixture thereof.

4. The method of claim 3, wherein the chain transfer agent is used in 10 to 3,000 moles based on 1 mole of the Salen-based catalyst.

5. The method of claim 1, wherein the poly(alkylene carbonate)polyol has carbonate and ether linkages.

6. The method of claim 1, wherein the Salen-based catalyst and the double metal cyanide catalyst are mixed at a weight ratio of 90:10 to 10:90.

7. The method of claim 6, wherein the Salen-based catalyst and the double metal cyanide catalyst are mixed at a weight ratio of 70:30 to 30:70.

8. The method of claim 1, wherein the alkylene oxide is used in 5,000 to 1,000,000 moles based on 1 mole of the Salen-based catalyst.

9. The method of claim 8, wherein the alkylene oxide is used in 15,000 to 200,000 moles based on 1 mole of the Salen-based catalyst.

* * * * *